(12) United States Patent
Anderson et al.

(10) Patent No.: US 11,405,501 B1
(45) Date of Patent: Aug. 2, 2022

(54) CALL RECORDING AUTHENTICATION

(71) Applicant: Zoom Video Communications, Inc., San Jose, CA (US)

(72) Inventors: Walter F. C. Anderson, Santa Cruz, CA (US); Vi Dinh Chau, Seattle, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/243,216

(22) Filed: Apr. 28, 2021

(51) Int. Cl.
  *G10L 17/00* (2013.01)
  *H04M 3/22* (2006.01)
  *H04W 12/65* (2021.01)
  *H04W 12/06* (2021.01)

(52) U.S. Cl.
  CPC .......... *H04M 3/2218* (2013.01); *G10L 17/00* (2013.01); *H04W 12/06* (2013.01); *H04W 12/65* (2021.01)

(58) Field of Classification Search
  None
  See application file for complete search history.

(56) References Cited

U.S. PATENT DOCUMENTS

| | | | |
|---|---|---|---|
| 6,345,094 B1 | 2/2002 | Khan et al. | |
| 6,785,370 B2 | 8/2004 | Glowny et al. | |
| 8,718,262 B2 * | 5/2014 | Conway | H04M 3/5232 379/211.01 |
| 9,197,744 B2 | 11/2015 | Sittin et al. | |
| 10,650,476 B2 | 5/2020 | Bassler et al. | |
| 10,657,971 B1 * | 5/2020 | Newstadt | G10L 15/26 |
| 10,750,009 B1 | 8/2020 | Cox et al. | |
| 10,887,081 B2 | 1/2021 | Oberhofer et al. | |
| 2014/0247926 A1 * | 9/2014 | Gainsboro | G10L 15/22 379/88.01 |
| 2016/0165044 A1 | 6/2016 | Chan | |
| 2017/0111506 A1 * | 4/2017 | Strong | G06F 21/552 |
| 2018/0034961 A1 * | 2/2018 | Engelke | G10L 25/48 |

(Continued)

OTHER PUBLICATIONS

Jonkoping University, International Business School, Blockchain in audit trails—An investigation of how blockchain can help auditors to implement audit trails, Rebecka Levenby and Emma Sahlin, <http://hj.diva-portal.org/smash/get/diva2:1212665/FULLTEXT01.pdf>, May 2018, 54 pages.

(Continued)

*Primary Examiner* — Neeraj Sharma
(74) *Attorney, Agent, or Firm* — Young Basile Hanlon & MacFarlane, P.C.

(57) ABSTRACT

Audio qualities of a call and of a call recording are identified and compared to authenticate the call recording as a true representation of the call. A call is enabled between two or more participants, and the call is recorded to generate a call recording. The call recording is authenticated based on a match between information determined during the call and information determined during the call recording. In some cases, the call recording is authenticated based on a match between audio scores for the call recording and audio scores for the call. In some cases, the call recording is authenticated based on a match between audio watermarks included within the call recording and audio watermarks included within the call. An indication of the authentication is then output, such as for further processing or display.

20 Claims, 9 Drawing Sheets

(56) References Cited

U.S. PATENT DOCUMENTS

| | | | |
|---|---|---|---|
| 2019/0238682 A1* | 8/2019 | Christiano | H04M 3/563 |
| 2019/0253558 A1* | 8/2019 | Haukioja | G10L 15/22 |
| 2019/0341050 A1* | 11/2019 | Diamant | H04N 7/155 |
| 2020/0007311 A1 | 1/2020 | Oberhofer et al. | |
| 2020/0211571 A1* | 7/2020 | Shoa | G10L 17/06 |
| 2020/0250287 A1* | 8/2020 | Singh | H04L 9/3213 |
| 2020/0349949 A1* | 11/2020 | Yoshioka | H04R 1/406 |
| 2020/0411013 A1* | 12/2020 | Horton | H04M 3/537 |
| 2021/0037136 A1* | 2/2021 | Michaeli | G10L 15/22 |
| 2022/0013114 A1* | 1/2022 | Camenares | G06N 20/00 |
| 2022/0014820 A1* | 1/2022 | Hannes | G06Q 30/0241 |

OTHER PUBLICATIONS

HAL archives-ouvertes.fr, Blockchain-Based Auditing of Transpared Log Servers, Nguyen et al., <https://hal.archives-puvertes.fr/hal-01917636/document>, Jul. 2018, 18 pages.

\* cited by examiner

CALL RECORDING AUTHENTICATION

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for call recording authentication.

One aspect of this disclosure is a method. The method includes enabling a call between two or more participants, recording the call to generate a call recording, authenticating the call recording based on a match between information determined during the call and information determined during the call recording, and outputting an indication of the authentication.

Another aspect of this disclosure is a system. The system includes a telephony system and an authentication system. The telephony system is configured to enable a call between two or more participants. The authentication system is configured to authenticate a recording of the call based on a match between information determined during the call and information determined during the recording.

Yet another aspect of this disclosure is an apparatus. The apparatus includes a memory and a processor configured to execute instructions stored in the memory to determine first information during a call, determine second information during a call recording generated based on the call, authenticate the call recording based on a match between the first information and the second information, and output an indication of the authentication.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
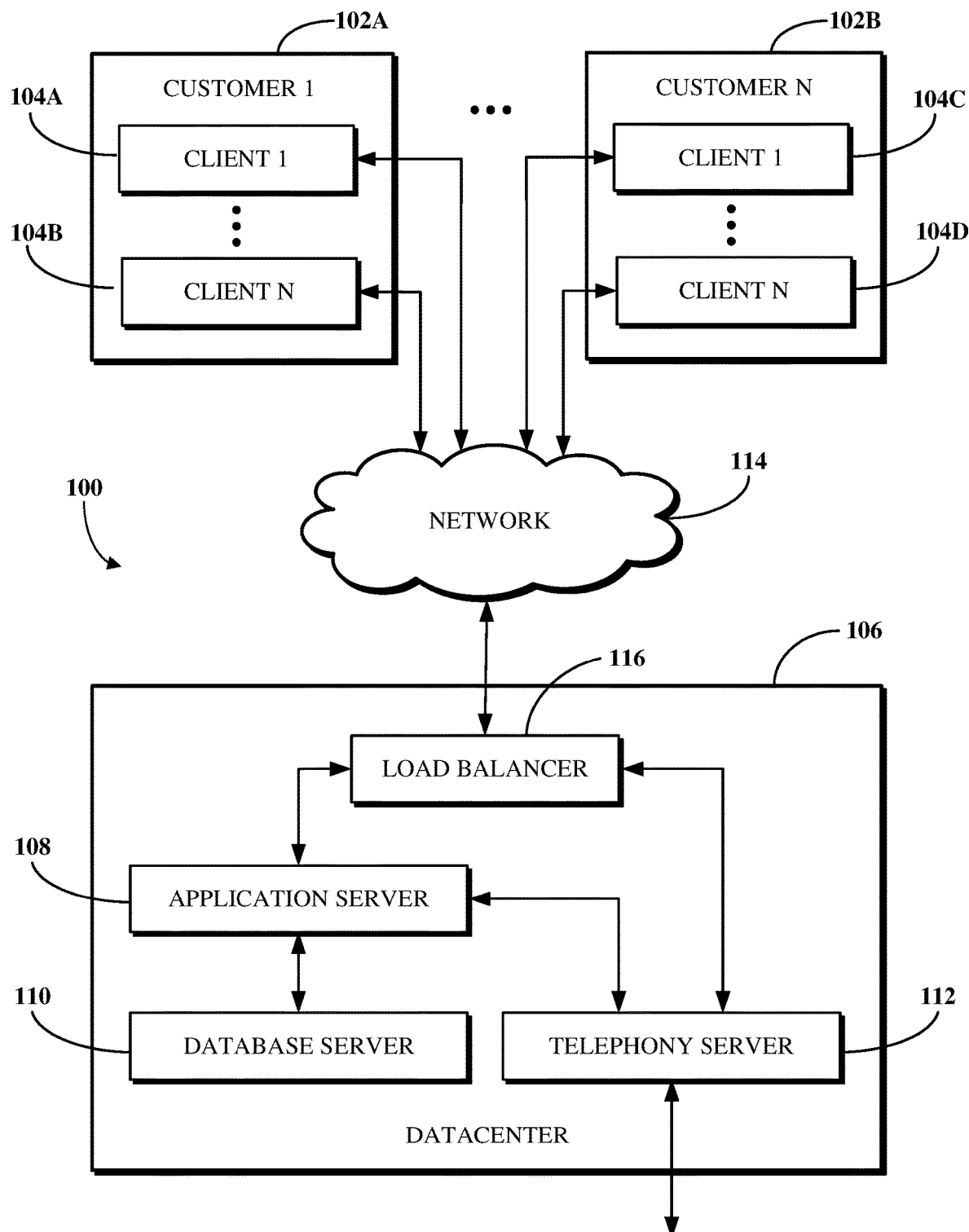
FIG. 1 is a block diagram of an example of an electronic computing and communications system.

Many call participants choose to record calls for later reference, such as for data gathering, quality assurance, or other purposes. In some cases, a call may be recording on behalf of all parties to the call. For example, a call center may by default record some or all incoming or outgoing calls with a notice to callers that their calls may be recorded. In another example, in compliance-required settings where calls are taking place within a regulated industry, for example, the financial industry, some or all incoming or outgoing calls may be recorded for later review, such as to verify whether the call participants complied with relevant rules, regulations, and/or laws.

When reviewing a call recording, and especially in the context of reviewing a call recording to verify that the subject of the call is in compliance with relevant rules, regulations, and/or laws, it is important to know that a call recording is a true representation of the call itself. A call recording can be considered a true representation of a subject call where the contents of the call recording match the contents of the call. For example, if there is a period of silence within a call recording, the call recording may be considered a true representation of the subject call where that period of silence was also present in the call itself. In particular, it is important to verify whether a call recording is a true representation of a subject call to determine whether the call recording has been tampered with or otherwise altered.

One approach to authenticating a call recording includes identifying call artifacts based on network connectivity issues of a participant to the call. In particular, a score may be computed during a call based on network information, such as the quality of packets signaled during the call from a device of that participant. The resulting score can imply the presence of some anomaly representative of a call artifact during the call, and a determination can then be made as to whether the call recording includes the same anomaly. However, this approach fails to determine whether a call recording is a true representation of a subject call because it does not give us a good understanding of whether audio qualities of the call recording matches audio qualities of the call itself.

Implementations of this disclosure address problems such as these by identifying and comparing audio qualities of a call and of a call recording are to authenticate the call recording as a true representation of the call. A call is enabled between two or more participants, and the call is recorded to generate a call recording. The call recording is authenticated based on a match between information determined at one or more times during the call and information determined at one or more times during the call recording. In some cases, the call recording is authenticated based on a match between audio scores for the call recording and audio scores for the call. In some cases, the call recording is authenticated based on a match between audio watermarks included within the call recording and audio watermarks included within the call. An indication of the authentication is then output, such as for further processing or display.

The implementations of this disclosure are described with respect to calls and call recordings; however, it should be understood that the implementations of this disclosure could also or instead be used for conferences and conference recording authentication. That is, generally, a call is a communication between two or more participants over a telephony service, and a conference is a communication between two or more participants over a conference service. Both a telephony service and a conference service may be used to record contents of calls or conferences, respectively. The audio score comparisons and the audio watermark comparisons disclosed herein may thus be performed for both calls and call recordings as well as conferences and conference recordings.

To describe some implementations in greater detail, reference is first made to examples of hardware and software structures used to implement a system for call recording authentication. FIG. 1 is a block diagram of an example of an electronic computing and communications system 100, which can be or include a distributed computing system (e.g., a client-server computing system), a cloud computing system, a clustered computing system, or the like. The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
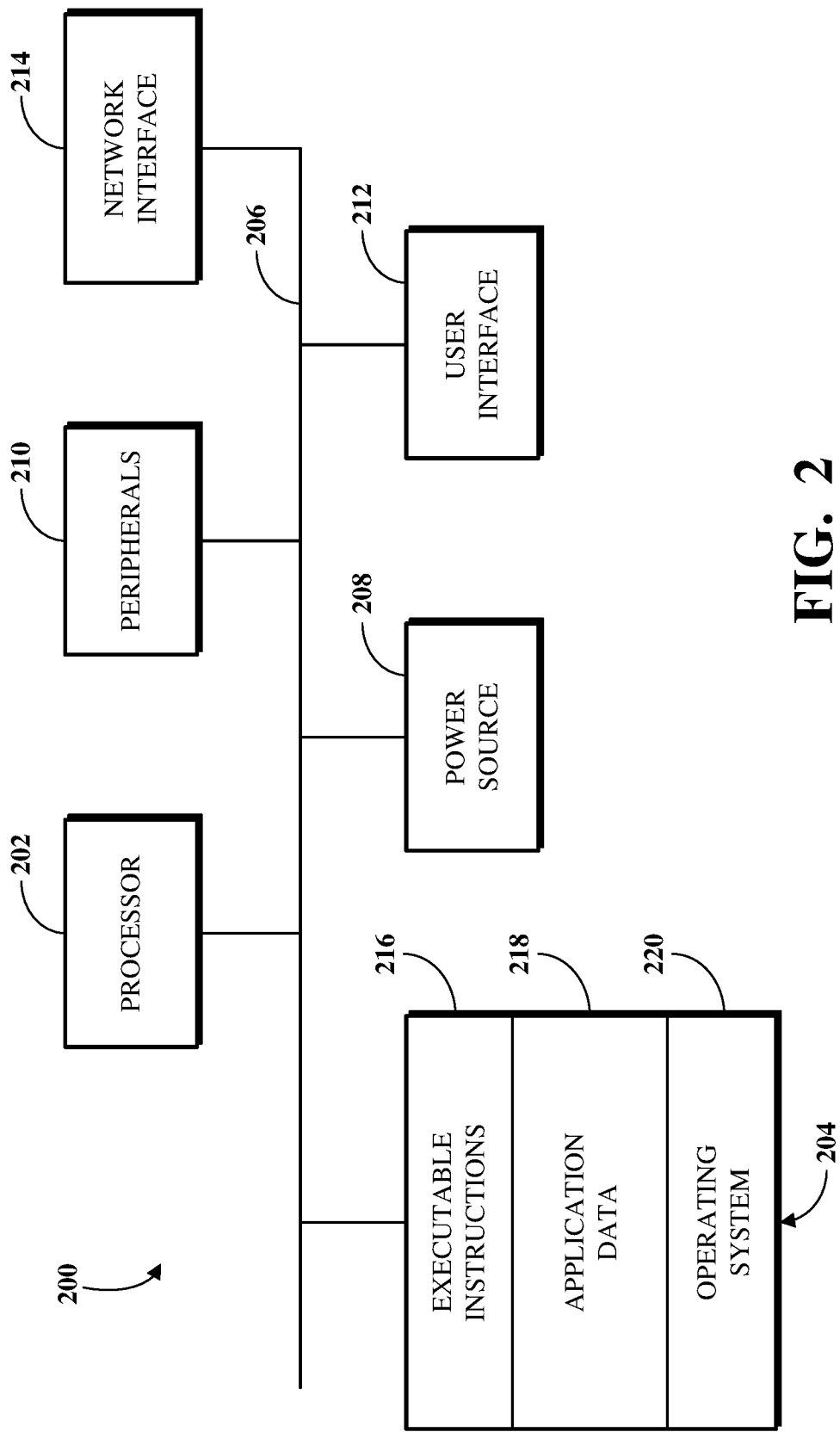
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
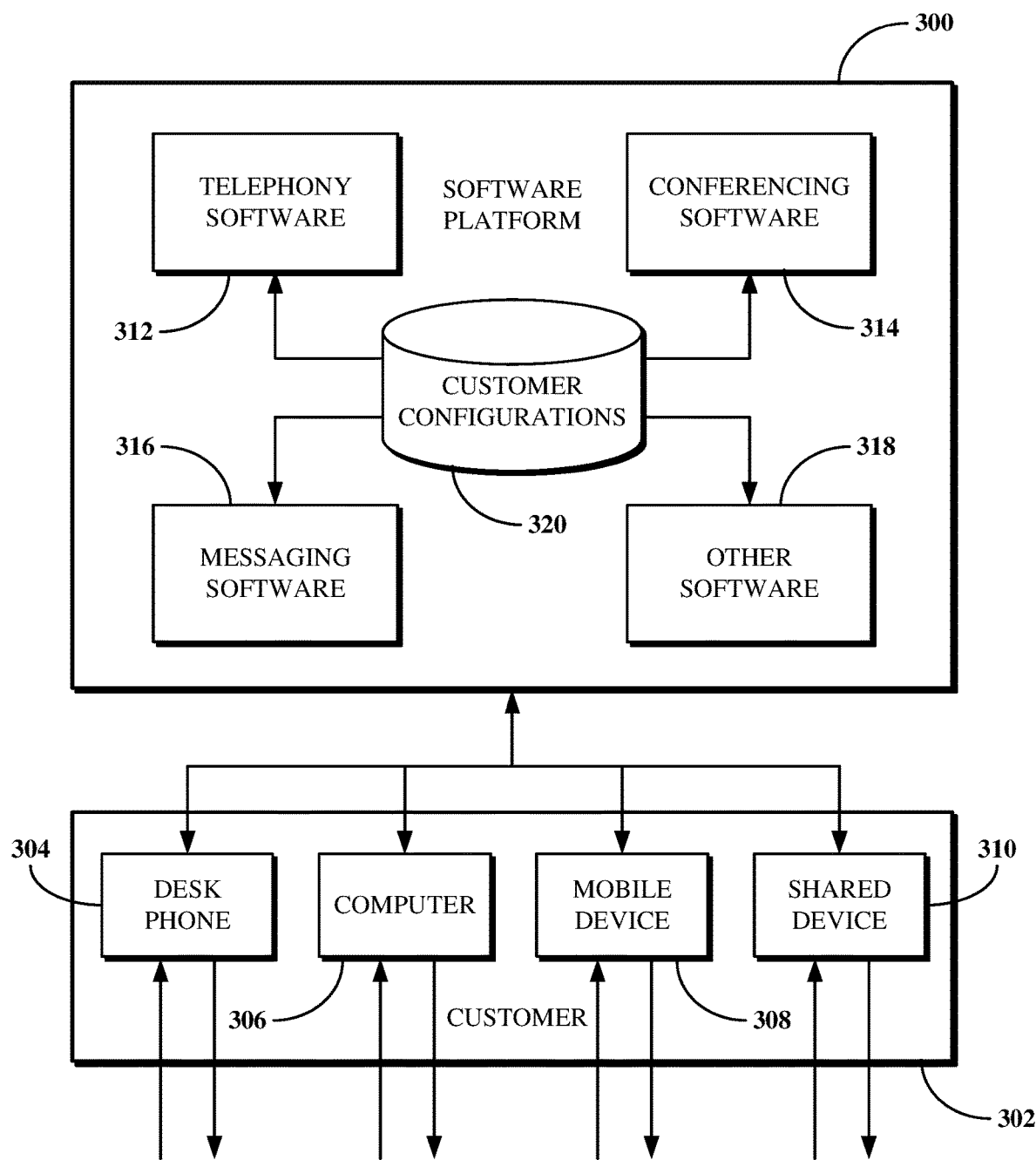
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for authenticating a call recording.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304-310.

Figure 4:
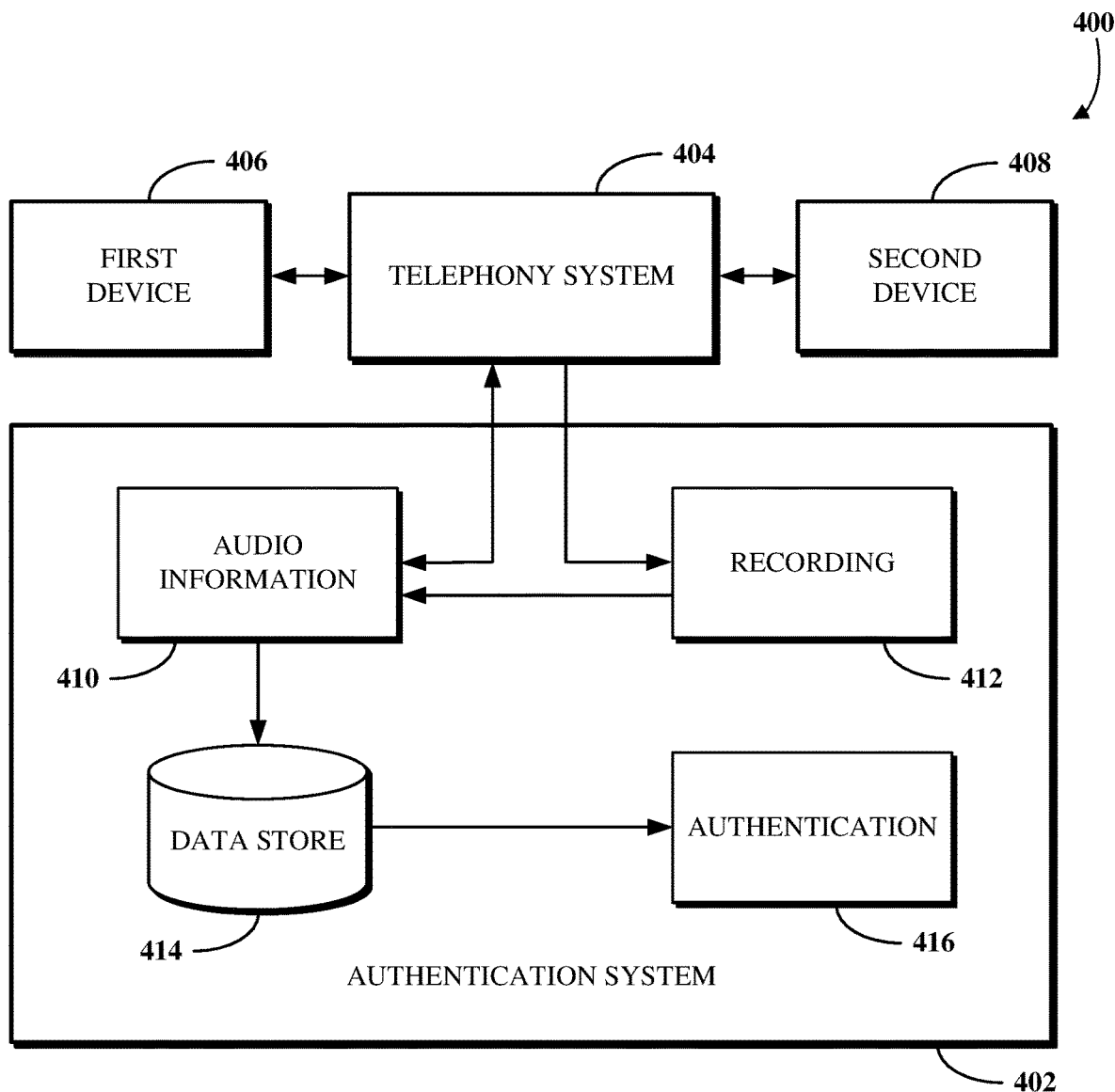
FIG. 4 is a block diagram of an example of a system for call recording authentication.

FIG. 4 is a block diagram of an example of a system 400 for call recording authentication. The system 400 includes an authentication system 402 and a telephony system 404. The telephony system 404 enables a call between an operator of a first device 406 as one participant and an operator of a second device 408 as another participant. Although only the first device 406 and the second device 408 are shown. The telephony system 404 may in some cases enable a call between more than two participants. The telephony system 404 includes hardware and/or software for enabling calls, for example, using the telephony server 112 shown in FIG. 1 and/or the telephony software 312 shown in FIG. 3.

The authentication system 402 includes an audio information tool 410, a recording tool 412, a data store 414, and an authentication tool 416. The audio information tool 410 determines audio information associated with a call enabled between the participants of the first device 406 and the second device 408 from the telephony system 404. The audio information may include audio scores determined at one or more times during the call, audio watermarks embedded into the call at one or more times during the call, or both. Examples of determining audio information including audio scores are described below with respect to FIG. 5. Examples of determining audio information including audio watermarks are described below with respect to FIG. 6. The audio information is stored in the data store 414. The audio information tool 410 determines the audio information during the call to accurately represent the call using the audio information.

In some implementations, the audio information tool 410 can cause audio data to be transmitted to the telephony system 404. For example, in implementations in which the audio information associated with the call includes audio watermarks, the audio watermarks can be generated, selected, or otherwise determined using the audio information tool 410 and thereafter transmitted to the telephony system 404 to embed the audio watermarks within the call. The audio information tool 410 can then store audio information indicative of those audio watermarks in the data store 414.

The recording tool 412 listens to the call enabled by the telephony system 404 and generates a call recording of the call. The recording tool 412 uses hardware and/or software to process audio data received from the telephony system 404 to generate the call recording. In some cases, the call recording is incrementally generated during the call such that the call record as a whole is considered generated upon the processing of the last audio data at the end of the call. In other cases, the call recording is generated after the call ends using audio data which is temporarily stored for processing following the end of the call. Other approaches for the call recording generation are also possible. In some implementations, where the audio information tool 410 causes audio data to be transmitted to the telephony system 404, such as where the audio information associated with the call includes audio watermarks, the recording tool 412 can generate a call recording including audio watermarks, such as because those audio watermarks were embedded within the call.

The call recording is then processed using the audio information tool 410 to determine audio information associated with the call recording. The audio information associated with the call recording determined using the audio information tool 410 is of a same type or types as the audio information determined for the call itself. For example, where the audio information tool 410 determines audio information including audio scores for the call, the audio information tool 410 uses the call recording to determine audio information including audio scores for the call recording. In another example, where the audio information tool 410 determines audio information including audio watermarks for the call, the audio information tool 410 uses the call recording to determine audio information including audio watermarks for the call recording. In some implementations, the audio information associated with the call recording can be stored in the data store 414.

In some implementations, the call recording may be stored in the data store 414 after it is generated using the recording tool 412 and before the audio information tool 410 uses the call recording to determine the audio information associated with the call recording. For example, the audio information tool 410 may initiate the process for determining the audio information associated with the call recording by retrieving the call recording from the data store 414. In some such implementations, the recording tool 412 may store the call recording in the data store 414.

The data store 414 is a data store, database, or other repository for storing information, data, and the like, including without limitation or requirement the audio information associated with the call, the audio information associated with the call recording, the call recording, and/or data associated with the call (e.g., information identifying the participants to the call, the first device 406, the second device 408, a start time of the call, an end time of the call, a total time of the call, a date of the call, and/or the like). The data store 414 may, for example, be implemented using the database server 110 shown in FIG. 1 or another hardware aspect. In some implementations, the data store 414 may be external to the authentication system 402. In some implementations, the call recording may be stored in the data store 414 other than by the recording tool 412. For example, where the data store 414 is external to the authentication system 402, the call recording may be stored in the data store 414 by a device operator or an external service. The call recording may thereafter be retrieved from the external data store using an application programming interface associated with the external data store.

The authentication tool 416 compares the audio information associated with the call and the audio information associated with the call recording to determine whether those audio information match. The particular manner of determining a match between the audio information associated with the call and the audio information associated with the call recording is based on the type of audio information. Thus, the operations performed to determine a match between the audio information associated with the call and the audio information associated with the call recording where the audio information includes audio scores are different from the operations performed to determine a match between the audio information associated with the call and the audio information associated with the call recording wherein the audio information includes audio watermarks. As mentioned above, the examples of determining audio information including audio scores are described below with respect to FIG. 5, and examples of determining audio information including audio watermarks are described below with respect to FIG. 6.

As shown, the authentication tool 416 retrieves the audio information associated with the call and the audio information associated with the call recording from the data store 414. However, in some implementations, the authentication tool 416 may receive the audio information associated with the call and/or the audio information associated with the call recording from one or more other sources. For example, the authentication tool 416 may receive the audio information associated with the call from the data store 414 and the audio information associated with the call recording from the audio information tool 410 (e.g., using a temporary storage for that information).

Regardless of the particular operations performed, the authentication tool 416 determines whether there is a match between the audio information associated with the call and the audio information associated with the call recording. The authentication tool 416 may then output an indication of the authentication, such as for further processing or display at a client device or other device. In particular, the indication of the authentication indicates that the call recording is a true representation of the call where a match is determined between the audio information associated with the call and the audio information associated with the call recording. Similarly, the indication of the authentication indicates that the call recording is not a true representation of the call where a match is not determined between the audio information associated with the call and the audio information associated with the call recording. The form of the indication output for further processing or display may be a visual indicator, an audio indicator, a text indicator, or the like. For example, the indication may be output over one or more modalities including without limitation telephony, conference, messaging, or the like.

In some implementations, the telephony system 404 may be replaced with a conferencing system. For example, the conferencing system may include hardware and/or software, such as the conferencing software 314 shown in FIG. 3, for implementing a conference between the operators of the first device 406 and the second device 408. In some such implementations, the operators of the first device 406 and the second device 408 are participants of a conference, which may include an audio component, a video component, or both.

For example, where the conference includes an audio component, media of the audio channel capturing that audio component of the conference can be processed using the audio information tool 410 to determine the audio information of the conference and also used by the recording tool 412 to generate a conference recording of the conference. Audio information of the conference recording may then be determined using the audio information tool 410. The audio information of the conference and/or the audio information of the conference recording may be stored in the data store 414 The authentication tool 416 then determines whether there is a match between the audio information of the conference and the audio information of the conference recording to determine an indication of the authentication to be output.

As shown, the system 400 includes the authentication system 402 and the telephony system 404. For example, the system 400 may be implemented as part of a software platform, such as the software platform 300 shown in FIG. 3, which includes telephony services as well as related services. In another example, system 400 may be implemented as part of a telephony platform which includes functionality for supporting or enhancing call technology. However, in some implementations, the system 400 may exclude the telephony system 404. For example, the authentication system 402 may be implemented by an entity which does not also implement the telephony system 404. In some such implementations, the telephony system 404 and the authentication system 402 may be configured to communicate with one another to perform the functionality of the system 400 as described herein.

Figure 5:
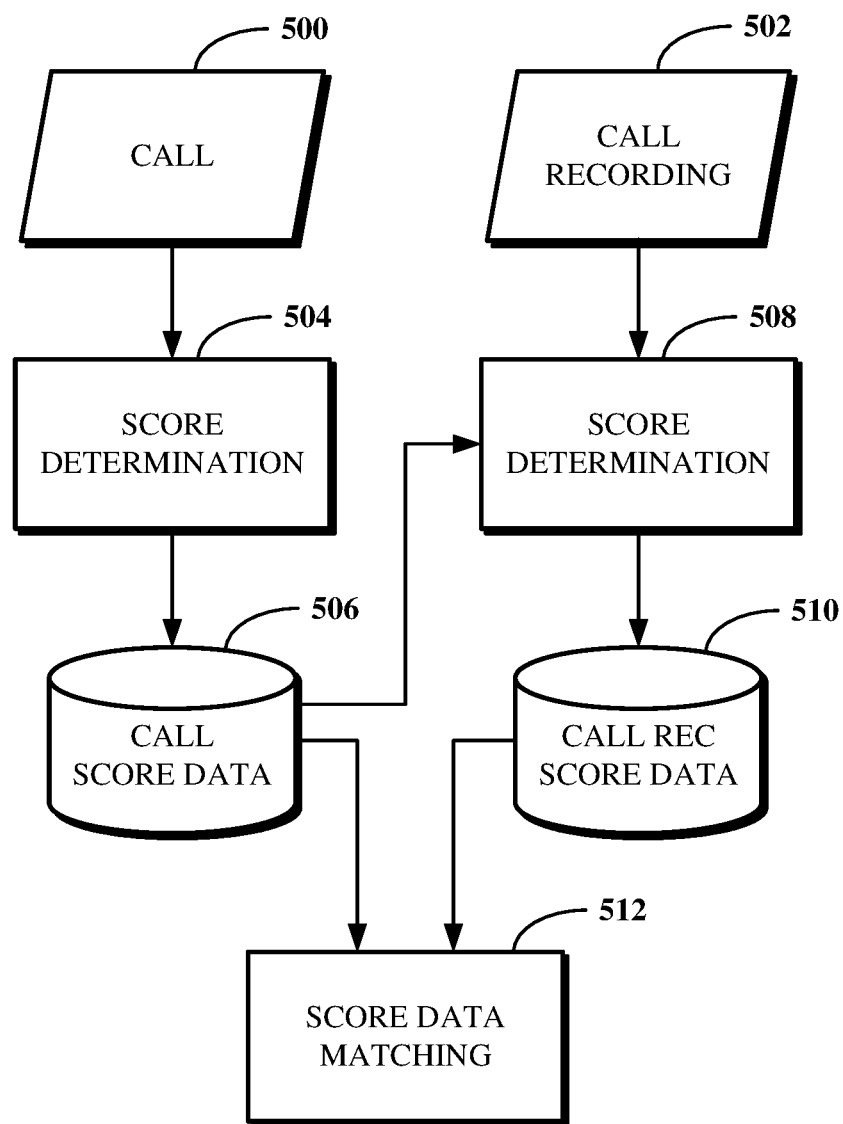
FIG. 5 is a block diagram of an example of call recording authentication using audio scores.

FIG. 5 is a block diagram of an example of call recording authentication using audio scores. According to implementations of this disclosure, audio scores may be determined for each of a call 500 and a call recording 502 at one or more times during each. The audio scores represent scores separately measured based on the audio qualities of the call 500 and of the call recording 502. The audio scores of the call 500 and of the call recording 502 can later be compared to determine whether they match. A determination of a match between the audio scores of the call 500 and the audio scores of the call recording 502 authenticates the call recording 502 as a true representation of the call 500.

The audio scores may be perceptible audio scores, voice activity detection scores, or other scores computed based on the audio of the call and the audio of the call recording. Generally, perceptible audio scores are scores determined based on the perceptible qualities of the audio within the call 500 or the call recording 502, and voice activity detection scores are scores determined based on the detection of human speech within the call 500 or the call recording 502. Regardless of whether the audio scores are perceptible audio scores, voice activity detection scores, or other audio scores, various scoring techniques or algorithms may be used to determine the audio scores for the call 500 and the audio scores for the call recording 502. Generally, the specific scoring technique or algorithm used to determine the audio scores for the call 500 and the audio scores for the call recording 502 is not particularly important, so long as the same scoring technique or algorithm is used to determine each of the audio scores for the call 500 and each of the audio scores for the call recording 502.

First, audio data of the call 500 is received, such as from a telephony system which enables the call 500 between two or more participants, for example, the telephony system 404 shown in FIG. 4. The audio data of the call 500 is processed by a score determination tool 504, which may, for example, be an implementation of the audio information tool 410 shown in FIG. 4. The score determination tool 504 processes the audio data of the call 500 to determine audio scores for the call 500 at one or more times during the call 500. For example, the audio scores for the call 500 may be determined at discrete time intervals (e.g., once per minute), or they may be more continuously determined during the call 500 (e.g., once per second or more).

The audio scores for the call 500 may be determined during the call 500 based on one or more of background noise, annunciated voice content, or syllable counts for the call 500. The audio scores for the call 500 are determined while the call 500 remains in-progress. Thus, the score determination tool 504 processes the call 500 in real-time or substantially in real-time to determine the audio scores for the call 500. Call score data 506 representing the audio scores for the call 500 and times during the call 500 to which respective ones of the audio scores correspond may then be stored in a data store, for example, the data store 414 shown in FIG. 4.

Next, the call recording is generated 502 based on audio data received from the telephony system which enables the call 500. For example, the call recording 502 may be generated using the recording tool 412 shown in FIG. 4. The audio data of the call recording 502 is processed by a score determination tool 508, which may be the same as the score determination tool 504 or a different software aspect. In either case, the score determination tool 508 functionally operates in the same way as the score determination tool 504, in particular, by determining audio scores for the call recording 502 at one or more times during the call recording 502.

However, the determination of the audio scores for the call recording 502 differs in two ways from the determination of the audio scores for the call 500. First, the audio scores for the call recording 502 are determined after the call has ended. That is, because the call recording 502 is generated after the call 500 is completed, the audio scores for the call recording 502 are not generated while the call remains in-progress. Second, the score determination tool 508 uses some or all of the call score data 506 to determine the audio scores for the call recording 502. In particular, the score determination tool 508 uses information indicating the times during the call 500 to which the call score data correspond and determines the audio scores for the call recording 502 at those same times during the call recording 502. For example, the call recording 502 may be synchronized to the call 500 at the start of the call recording 502 to ensure that the scoring performed by the score determination tool 508 uses information from the same intervals of the call 500 and of the call recording 502. Call score data 510 representing the audio scores for the call recording 502 and times during the call recording 502 to which respective ones of the audio scores correspond may then be stored in a data store, for example, the data store 414 shown in FIG. 4.

Finally, a score data matching tool 512 compares the call score data 506 and the call recording score data 510 to determine whether there is a match between the audio scores for the call 500 and the audio scores for the call recording 502. To do so, the score data matching tool 512, which may, for example, be implemented by the authentication tool 416 shown in FIG. 4, compares each pair of score data from the call score data 506 and the call recording score data 510 in which a pair includes a datum of the call score data 506 corresponding to a given time within the call 500 and a datum of the call recording score data 510 corresponding to the same given time within the call recording 502.

A match is determined between the audio scores for the call 500 and the audio scores for the call recording 502 where the data of each pair is a match. However, in some implementations, a threshold variance may be permitted between the specific values of the data of a given pair. The threshold variance may be defined based on the scoring scale used by the score determination tool 504 and the score determination tool 508 or based on another setting, configuration, or definition. For example, the call recording 502 may be produced by a lossy compression or other processing of the call 500. The lossy compression or other lossy processing of the call 500 preserves the audio content of the call 500 within the call recording 502, but at a lower fidelity than the original audio content of the call 500. Thus, the threshold variance ensures that the audio scores for the call 500 and the audio scores for the call recording 502 have a threshold correlation even if they are not identical.

Figure 6:
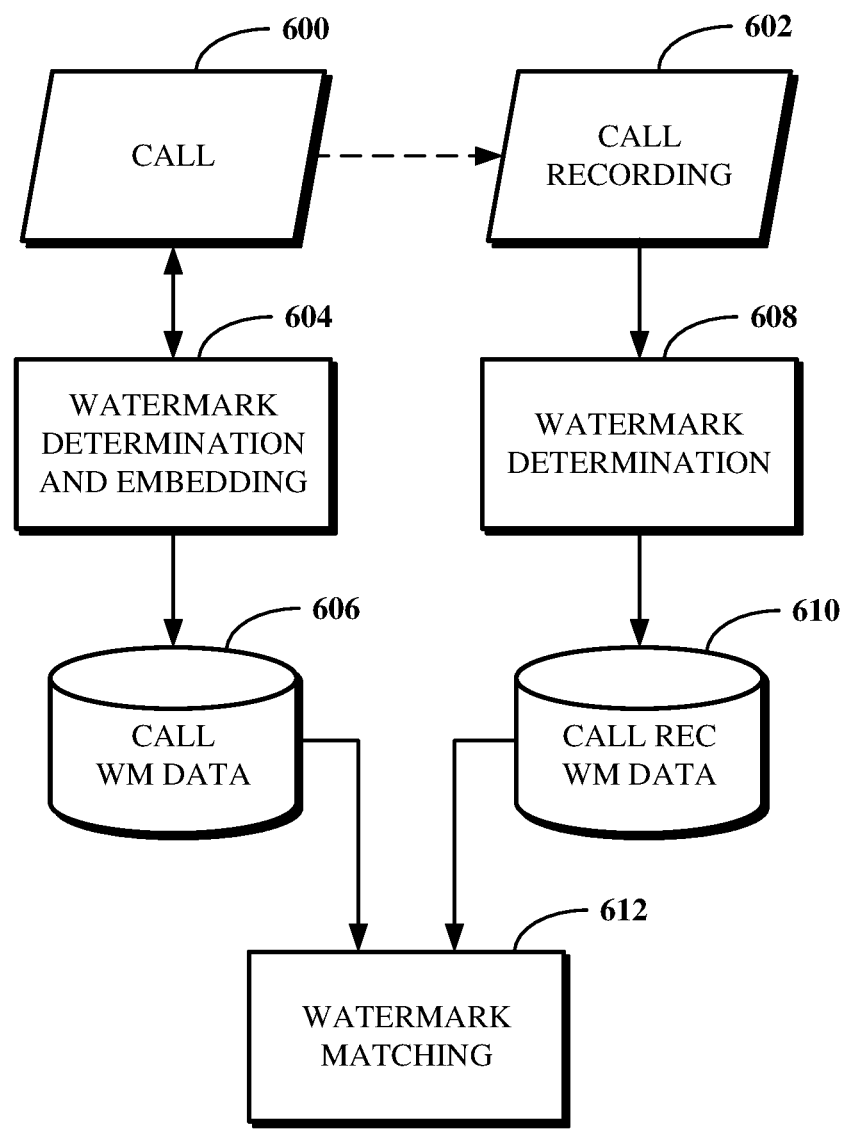
FIG. 6 is a block diagram of an example of call recording authentication using audio watermarks.

FIG. 6 is a block diagram of an example of call recording authentication using audio watermarks. According to implementations of this disclosure, audio watermarks may be introduced within a call 600 at discrete time intervals (e.g., once per minute) or more continuously (e.g., once per second or more). Those audio watermarks each include audio signal information embedded within the call 600. The audio signal information may, for example, be or include sound energy wave amplitudes, frequencies, and the like. The audio signal information is generally imperceptible to humans to prevent the audio watermarks from affecting a perceptible quality of the audio of the call 600. In some implementations, an audio watermark embedded within the call 600 may include some audio signal information unique to the call 600, one or more of the participants of the call 600, a service associated with the call 600, and/or the telephony system used to enable the call 600, such as to authenticate same.

Later, a call recording 602 generated based on the call is processed to determine audio watermarks included in the call recording 602. The audio watermarks of the call 600 and the audio watermarks of the call recording 602 can be compared to determine whether they match. A determination of a match between the audio watermarks of the call 600 and the audio watermarks of the call recording 602 authenticates the call recording 602 as a true representation of the call 600.

First, audio data of the call 600 is received, such as from a telephony system which enables the call 600 between two or more participants, for example, the telephony system 404 shown in FIG. 4. The audio data of the call 600 is processed by a watermark determination and embedding tool 604, which may, for example, be an implementation of the audio information tool 410 shown in FIG. 4. The watermark determination and embedding tool 604 processes the audio data of the call 600 to determine audio watermarks to embed within the call 600 at various times and thereafter embeds those audio watermarks within the call 600 at those times. Embedding an audio watermark within the call 600 includes transmitting data representative of the audio watermark to the telephony system which enables the call 600 to cause the transmitted data to be exposed within and as part of the call 600 itself. Call watermark data 606 representing the audio watermarks determined for and embedded within the call 600 may then be stored in a data store, for example, the data store 414 shown in FIG. 4.

Next, the call recording is generated 602 based on audio data received from the telephony system which enables the call 600. For example, the call recording 602 may be generated using the recording tool 412 shown in FIG. 4. Because the audio watermarks are embedded within the call 600, those audio watermarks are captured as part of the audio data received from the telephony system and used to generate the call recording 602. The audio data of the call recording 602 is processed by a watermark determination tool 608, which may be the same as the watermark determination and embedding tool 604 or a different software aspect.

In either case, the watermark determination tool 608 operates to determine audio watermarks within the call recording 602 at one or more times during the call recording 602. For example, the watermark determination tool 608 may process the audio data of the call recording 602 to identify audio watermarks within the call recording 602. Identifying an audio watermark within the call recording 602 can include one or more of identifying a certain time during the call recording 602 at which the audio watermark is detected, identifying a particular audio signal information value or parameter of the audio watermark, or the like. Call recording watermark data 610 representing the audio watermarks determined for the call recording 602 may then be stored in a data store, for example, the data store 414 shown in FIG. 4.

Finally, a watermark matching tool 612 compares the call watermark data 606 and the call recording watermark data 610 to determine whether there is a match between the audio watermarks included within the call 600 and the audio watermarks included within the call recording 602. To do so, the watermark data matching tool 612, which may, for example, be implemented by the authentication tool 416 shown in FIG. 4, compares each pair of watermark data from the call watermark data 606 and the call recording watermark data 610 in which a pair includes a datum of the call watermark data 606 corresponding to a given time within the call 600 and a datum of the call recording watermark data 610 corresponding to the same given time within the call recording 602.

A match is determined between the audio watermarks for the call 600 and the audio watermarks for the call recording 602 where the data of each pair is a match. However, in some implementations, a threshold variance may be permitted between the specific values of the data of a given pair. The threshold variance may be defined based on the types of audio signal information represented as the audio watermarks or based on another setting, configuration, or definition associated therewith.

Figure 7:
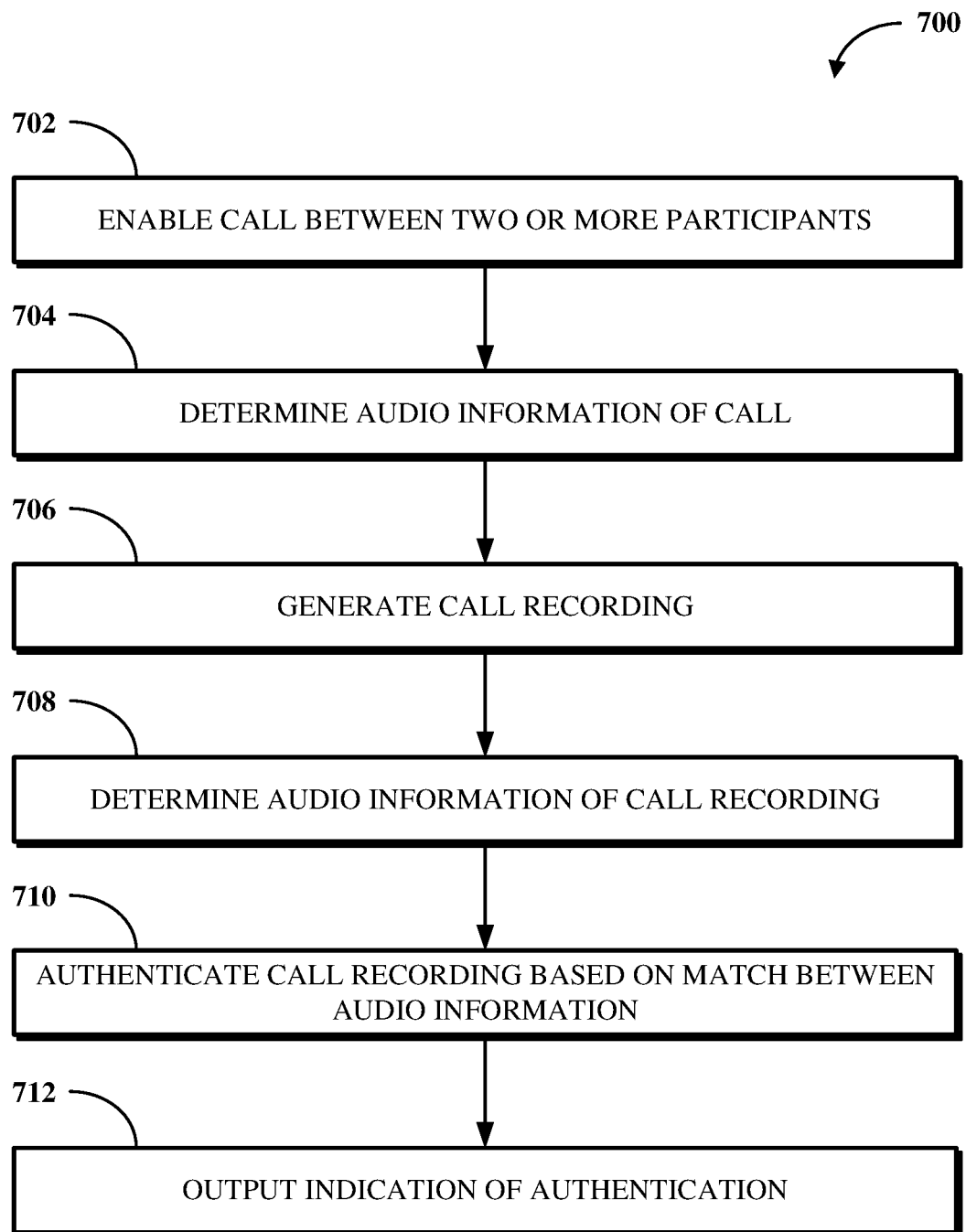
FIG. 7 is a flowchart of an example of a technique for call recording authentication.
Figure 8:
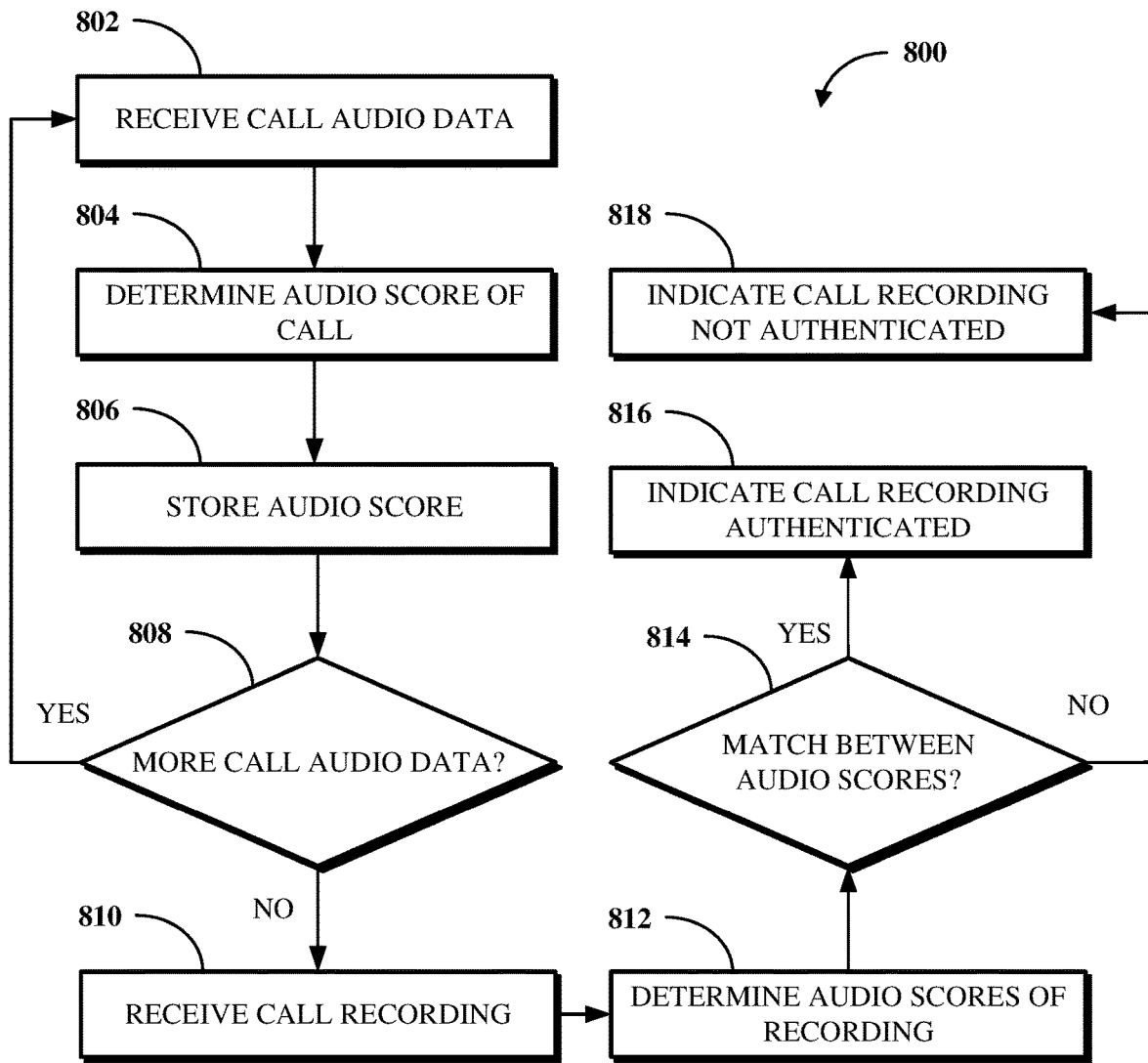
FIG. 8 is a flowchart of an example of a technique for call recording authentication using audio scores.
Figure 9:
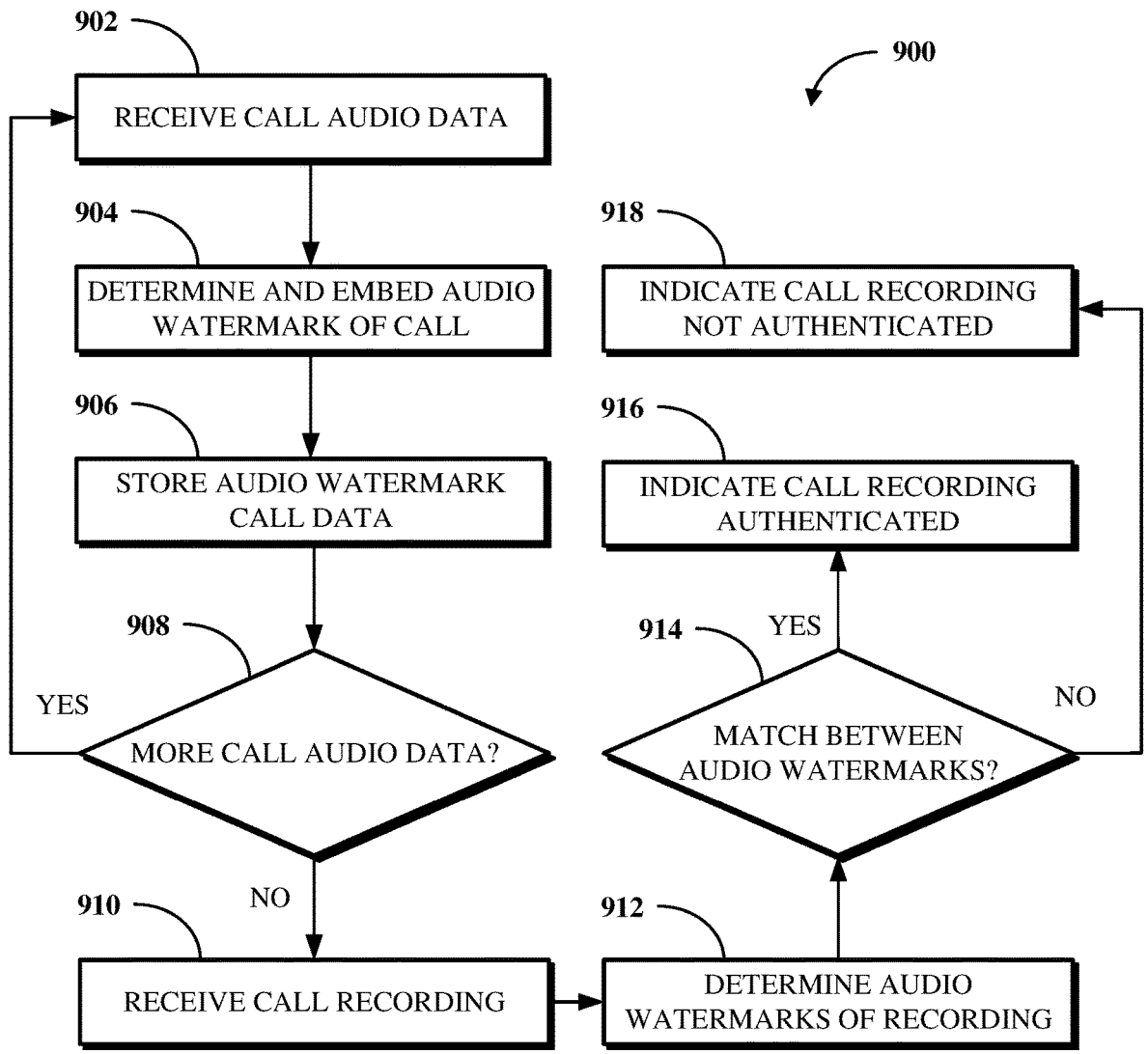
FIG. 9 is a flowchart of an example of a technique for call recording authentication using audio watermarks.

To further describe some implementations in greater detail, reference is next made to examples of techniques for call recording authentication. FIG. 7 is a flowchart of an example of a technique 700 for call recording authentication. FIG. 8 is a flowchart of an example of a technique 800 for call recording authentication using audio scores. FIG. 9 is a flowchart of an example of a technique 900 for call recording authentication using audio watermarks.

The techniques 700, 800, and/or 900 can be executed using computing devices, such as the systems, hardware, and software described with respect to FIGS. 1-6. The techniques 700, 800, and/or 900 can be performed, for example, by executing a machine-readable program or other computer-executable instructions, such as routines, instructions, programs, or other code. The steps, or operations, of the techniques 700, 800, and/or 900, or another technique, method, process, or algorithm described in connection with the implementations disclosed herein can be implemented directly in hardware, firmware, software executed by hardware, circuitry, or a combination thereof.

For simplicity of explanation, the techniques 700, 800, and 900 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, a flowchart of the technique 700 for call recording authentication is shown. At 702, a call is enabled between two or more participants. Enabling the call can include facilitating a direct or indirect telephony connection between the two or more participants in which at least two devices are connected to an intermediary telephony service.

At 704, audio information associated with the call is determined. The audio information associated with the call may include audio scores (e.g., perceptible audio scores, voice activity detection scores, or other audio scores) determined for the call, audio watermarks embedded within the call, or both. The audio information associated with the call is determined using call audio received from a telephony service used to enable the call. In particular, the audio information associated with the call is determined during the call. The audio information associated with the call may in at least some cases be stored, such as in a data store.

At 706, a call recording of the call is generated, such as by the recording of the call as it occurs or converting temporarily stored audio data of the call into a call recording. The call recording of the call may in at least some cases be stored, such as in a data store, which may be the same data store as the data store within which the audio information may be stored or a different data store.

At 708, audio information associated with the call recording is determined. The audio information associated with the call recording may include audio scores (e.g., perceptible audio scores, voice activity detection scores, or other audio scores) of the call, audio watermarks of the call, or both. In particular, the audio information associated with the call recording is determined during the call recording. The audio information associated with the call recording is determined using call audio included in the call recording.

At 710, the call recording is authenticated based on a match between the audio information associated with the call and the audio information associated with the call recording. The particular manner of determining a match between the audio information associated with the call and the audio information associated with the call recording is based on the type of audio information. However, in either case, a match is determined between the audio information associated with the call and the audio information associated with the call recording where those audio information partially or wholly match. In some implementations, a degree of error may be available to some or all of the audio information, such as to prevent a false negative determination that there is no match.

At 712, an indication of the authentication is output, such as for further processing or display. For example, the indication of the authentication may be output to one or more client devices or other devices and over one or more modalities including without limitation telephony, conference, messaging, or the like.

Referring next to FIG. 8, a flowchart of the technique 800 for call recording authentication using audio scores is shown. At 802, audio data of a call in-progress is received from a telephony system which enables the call between two or more participants. The audio data is audio data received at a specific point in time during the call. The point in time during the call to which the audio data corresponds may be based on a timing definition or configuration for determining audio scores during the call. For example, the audio data may be audio data sampled from the call on a one minute interval or another basis.

At 804, an audio score (e.g., a perceptible audio score, a voice activity detection score, or another audio score) of the call at a particular time during the call is determined. The audio score is determined specific to the received audio data. The audio score may be determined using one or more scoring techniques or algorithms. The particular format of the audio score may be expressed as a numeric value or as another value. Depending on the type of the audio score, the audio score of the call may be determined based on one or more of background noise, annunciated voice content, or syllable counts within the subject audio data.

At 806, data associated with the audio score of the call is stored. The data associated with the audio score includes the score value as well as the time during the call at which the received audio data used to determine the audio score occurred. The data associated with the audio score of the call may be stored in a data store.

At 808, a determination is made as to whether there is more audio data of the call to be processed to determine further audio scores. Determining whether there is more audio data of the call to be processed can include determining whether the call has been completed. For example, if the call has been completed, there will not be further audio data of the call to be processed. Responsive to a determination that there is more audio data of the call to be processed, the technique 800 returns to 802 to receive the next audio data of the call and process same at 804 and 806 before repeating the determination at 808.

At 810, responsive to a determination that there is not more audio data of the call to be processed, such as because the call has been completed, a call recording of the call is received. The call recording is generated after the call is completed.

At 812, audio scores (e.g., perceptible audio scores, voice activity detection scores, or other audio scores) are determined during the call recording at the same times at which the audio scores were determined during the call. Determining the audio scores during the call recording includes retrieving the data associated with the audio scores of the call from the data store to identify the times at which audio scores are to be determined during the call recording. That is, the audio scores are to be determined during the call recording at the same times as they were determined during the call. Each audio score of the call recording is determined specific to the audio data of the call recording at such a point in time. The audio scores of the call recording may be determined using one or more scoring techniques or algorithms. The particular format of the audio scores of the call recording may be expressed as a numeric value or as another value. Depending on the type of the audio score, an audio score of the call recording may be determined based on one or more of background noise, annunciated voice content, or syllable counts within the subject audio data. Since the audio scores are for the call recording, they are determined after the call has ended.

At 814, a determination is made as to whether there is a match between the audio scores of the call and the audio scores of the call recording. Determining whether there is a match between the audio scores of the call and the audio scores of the call recording includes comparing pairs of the audio scores in which each pair corresponds to a particular point in time during both the call and the call recording and includes the audio score of the call at that point in time and the audio score of the call recording at that point in time. A match is determined where the audio scores of each pair are the same.

In some implementations, a threshold range may be defined, such as to accommodate false negatives arising due to formatting considerations associated with the generation of the call recording. For example, a pair of audio scores may be determined to match where the values thereof are within that threshold range.

At 816, responsive to determining a match between the audio scores of the call and the audio scores of the call recording, the call recording is authenticated, and an indication that the call recording is authenticated is output. However, at 818, responsive to not determining a match between the audio scores of the call and the audio scores of the call recording, the call recording is not authenticated, an indication that the call recording is not authenticated is output.

Referring finally to FIG. 9, a flowchart of the technique 900 for call recording authentication using audio watermarks is shown. At 902, audio data of a call in-progress is received from a telephony system which enables the call between two or more participants. The audio data is audio data received at a specific point in time during the call. The point in time during the call to which the audio data corresponds may be based on a timing definition or configuration for embedding audio watermarks during the call. For example, the audio data may be audio data sampled from the call on a one minute interval or another basis.

At 904, an audio watermark of the call is determined and embedded within the call at a particular time during the call. The audio watermark may be determined based on information associated with the call, one or more of the participants to the call, the telephony system, or another factor. The audio watermark is then embedded within the call by transmitting the audio data representative of the audio watermark to the telephony system.

At 906, data associated with the audio watermark of the call is stored. The data associated with the audio watermark includes the audio watermark itself as well as the time during the call at which the audio watermark is embedded. The data associated with the audio watermark of the call may be stored in a data store.

At 908, a determination is made as to whether there is more audio data of the call to be processed to determine and embed further audio watermarks. Determining whether there is more audio data of the call to be processed can include determining whether the call has been completed. For example, if the call has been completed, there will not be further audio data of the call to be processed. Responsive to a determination that there is more audio data of the call to be processed, the technique 900 returns to 902 to receive the next audio data of the call and process same at 904 and 906 before repeating the determination at 908.

At 910, responsive to a determination that there is not more audio data of the call to be processed, such as because the call has been completed, a call recording of the call is received. The call recording is generated after the call is completed. The call recording is generated using audio captured from the call. Accordingly, and provided the audio recording is a true representation of the call, the audio recording should include the audio watermarks embedded within the call.

At 912, audio watermarks are determined during the call recording at the same times at which audio watermarks were embedded during the call. Determining the audio watermarks of the call recording includes processing audio data of the call recording to identify audio signal information representative of audio watermarks and determining times during the call recording at which those audio watermarks are determined.

At 914, a determination is made as to whether there is a match between the audio watermarks of the call and the audio watermarks of the call recording. Determining whether there is a match between the audio watermarks of the call and the audio watermarks of the call recording includes comparing pairs of the audio watermarks in which each pair corresponds to a particular point in time during both the call and the call recording and includes the audio watermark of the call at that point in time and the audio watermark of the call recording at that point in time. A match is determined where the audio watermarks of each pair are the same. For example, determining whether there is a match between the audio watermarks of the call and the audio watermarks of the call recording can include retrieving the audio watermark call data from the data store.

In some implementations, a threshold range may be defined, such as to accommodate false negatives arising due to formatting considerations associated with the generation of the call recording. For example, a pair of audio watermarks may be determined to match where values thereof are within that threshold range.

At 916, responsive to determining a match between the audio watermarks of the call and the audio watermarks of the call recording, the call recording is authenticated, and an indication that the call recording is authenticated is output.

However, at 918, responsive to not determining a match between the audio watermarks of the call and the audio watermarks of the call recording, the call recording is not authenticated, an indication that the call recording is not authenticated is output.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   enabling a call between two or more participants;
   recording the call to generate a call recording;
   determining audio scores for the call during the call based on one or more of background noise, annunciated voice content, or syllable counts for the call;
   determining audio scores for the call recording during the call recording based on one or more of background noise, annunciated voice content, or syllable counts for the call recording;
   authenticating the call recording responsive to determining that the audio scores for the call recording match the audio scores for the call; and
   outputting an indication of the authentication.

2. The method of claim 1, wherein the audio scores for the call are determined while the call remains in-progress and the audio scores for the call recording are determined after the call has ended.

3. The method of claim 2, wherein the audio scores for the call are stored in a data store, the method further comprising:
   retrieving the audio scores for the call from the data store; and
   determining whether the audio scores determined during the call recording match the retrieved audio scores.

4. The method of claim 1, wherein the audio scores for the call and the audio scores for the call recording are determined at discrete time intervals.

5. The method of claim 1, wherein the audio scores for the call and the audio scores for the call recording are continuously determined.

6. A system, comprising:
   a telephony system configured to enable a call between two or more participants; and
   an authentication system configured to:
     determine audio scores for the call during the call;
     determine, by processing a recording of the call after the call ends, audio scores for the recording based on times during the call at which the audio scores for the call are determined; and
     authenticate the recording of the call based on a match between the audio scores for the call and the audio scores for the recording.

7. The system of claim 6, wherein the audio scores for the call are determined while the call remains in-progress and the audio scores for the call recording are determined after the call has ended.

8. The system of claim 7, wherein the audio scores for the call are stored in a data store, and wherein the authentication system is configured to:
   retrieve the audio scores for the call from the data store; and
   determine whether the audio scores determined during the recording match the retrieved audio scores.

9. The system of claim 6, wherein the audio scores for the call and the audio scores for the recording are determined at discrete time intervals.

10. The system of claim 6, wherein the audio scores for the call and the audio scores for the recording are continuously determined.

11. The system of claim 6, wherein the audio scores for the call are determined based on one or more of background noise, annunciated voice content, or syllable counts for the call.

12. The system of claim 6, wherein the audio scores for the recording are determined based on one or more of background noise, annunciated voice content, or syllable counts for the call recording.

13. An apparatus, comprising:
   a memory; and
   a processor configured to execute instructions stored in the memory to:
      determine audio scores for a call between two or more participants;
      determine, by processing a call recording generated based on the call after the call ends, audio scores for the call recording;
      authenticate the call recording based on a match between the audio scores for the call and the audio scores for the call recording; and
      output an indication of the authentication.

14. The apparatus of claim 13, wherein the audio scores for the call are determined while the call remains in-progress and the audio scores for the call recording are determined after the call has ended.

15. The apparatus of claim 14, wherein the audio scores for the call are stored in a data store, and wherein the processor is configured to execute the instructions to:
   retrieve the audio scores for the call from the data store; and
   determine whether the audio scores determined during the call recording match the retrieved audio scores.

16. The apparatus of claim 13, wherein the audio scores for the call and the audio scores for the call recording are determined at discrete time intervals.

17. The apparatus of claim 13, wherein the audio scores for the call and the audio scores for the call recording are continuously determined.

18. The apparatus of claim 13, wherein the audio scores for the call are determined based on one or more of background noise, annunciated voice content, or syllable counts for the call.

19. The apparatus of claim 13, wherein the audio scores for the call recording are determined based on one or more of background noise, annunciated voice content, or syllable counts for the call recording.

20. The apparatus of claim 13, wherein the processor is configured to execute the instructions to:
   enable the call between the two or more participants.

* * * * *